(12) United States Patent  
Shitrit (10) Patent No.: US 8,001,530 B2
(45) Date of Patent: Aug. 16, 2011

(54) METHOD AND FRAMEWORK FOR OBJECT CODE TESTING

(75) Inventor: Meir Shitrit, Rishon Lezion (IL)

(73) Assignee: SAP AG, Walldorf (DE)

( * ) Notice: Subject to any disclaimer, the term of this patent is extended or adjusted under 35 U.S.C. 154(b) by 1145 days.

(21) Appl. No.: 11/617,132

(22) Filed: Dec. 28, 2006

(65) Prior Publication Data

US 2008/0163165 A1    Jul. 3, 2008

(51) Int. Cl.
*G06F 9/44* (2006.01)
(52) U.S. Cl. ........................................ 717/124
(58) Field of Classification Search .................... 717/124
See application file for complete search history.

(56) References Cited

U.S. PATENT DOCUMENTS

| | | | | |
|---|---|---|---|---|
| 5,822,587 | A * | 10/1998 | McDonald et al. | 717/108 |
| 6,332,211 | B1 * | 12/2001 | Pavela | 717/130 |
| 6,421,822 | B1 * | 7/2002 | Pavela | 717/125 |
| 6,546,506 | B1 * | 4/2003 | Lewis | 717/124 |
| 6,978,440 | B1 * | 12/2005 | Pavela | 717/125 |
| 7,493,592 | B2 * | 2/2009 | Karatal et al. | 717/105 |
| 7,493,597 | B2 * | 2/2009 | Hefner | 717/124 |
| 2002/0069399 | A1 * | 6/2002 | Miloushey et al. | 717/108 |
| 2003/0196190 | A1 * | 10/2003 | Ruffolo et al. | 717/124 |
| 2004/0194065 | A1 * | 9/2004 | McGrath et al. | 717/124 |
| 2007/0277154 | A1 * | 11/2007 | Badwe | 717/124 |

* cited by examiner

*Primary Examiner* — Wei Y Zhen
*Assistant Examiner* — Junchun Wu (57) ABSTRACT

A method and framework for automatic non-intrusive testing of object code. The invention comprising a component for defining a test for object code, the test comprising property assignment, validity checking and operation invocation for objects. The object properties after each operation or assignment are compared against a reference object, and the results are reported to the testing person.

19 Claims, 7 Drawing Sheets

```
2    Load Dll DLL_D
3    Create first_object_A
4    Create Second_object_A
5    Set property P of first_object_A and second_object_A to V
6    Call Method_B of Second_Object_A
7    If (property P of First_object_A == property P of Second_Object_A)
8        Report SUCCESS
9    Else
10       Report Failure: different attributes
11   If (result of Method_B == designated result)
12       Report Success
13   Else
14       Report Failure: operation failed

# METHOD AND FRAMEWORK FOR OBJECT CODE TESTING

BACKGROUND OF THE INVENTION

1. Field of the Invention

The present invention relates to a method and framework for code testing in general, and to testing object code without additional layers in particular.

2. Discussion of the Related Art

Code testing is a major part in the development cycle of computer programs. Testing is a process intended to reveal and enable the correction of faulty behavior, problems, inefficiencies and other quality-related issues about the product. Adequate testing is essential for assuring proper performance of the written code. Testing generally starts with testing the smallest possible units, called "unit test", which is usually done by the code developer, and continues with integration testing, system testing, and acceptance testing, which should comprise following test plans or test scenarios associated with the system. However, proper testing, at all levels, requires human and time resources which are often not allowed enough time for. As a result, code is often tested only in a number of a-priori known scenarios which may not be sufficient, so that certain parts of the code are not executed and problems or bugs are not trapped until other programmers' codes are involved. Such bug may present itself only much later in a more complex situation, wherein the bug trapping is much more complex, time consuming and expensive, and its correction may involve major change in the system. Further problems result from changes to existing code, which are believed to be insignificant, so intensive regression tests are not performed, but they may introduce new bugs. Testing is often performed only when user interface, whether the final user interface of the product or an earlier version thereof is available for activating the code. Thus, a programmer writing "internal", i.e. non-user-interface code may postpone testing his code until a much later time. In addition, the user interface and the tests designed for the user interface may not activate each and every command, so that certain parts may be activated for the first time in unexpected situations, and provide unexpected behavior. Another option for testing code requires inserting additional code, required only for testing. However, this is a tiring process which is seldom performed diligently and intelligently enough to cover all possibilities. Further, such code slows the execution and demands maintenance. Keeping a dedicated "debug" version, wherein the "regular" version lacks the debugging code is either impossible or introduces new errors into the code. The situation is no different when object oriented code is involved. For clarity, the term method in the context of object-oriented programming will be referred to as "operation". In the absence of user interface which activates operations of the business-related objects, or having a user interface that does not cover all functionality of the code in all situations, some operations are not tested at all, while others may be partially tested, or tested during creation but neglected later on in further situations.

There is therefore a need for a method and framework or apparatus for testing object oriented code by activating all required object operations in an automated fashion without requiring a programmer to write and maintain neither user interface code nor dedicated testing code. The method and apparatus should support performing tests and checking whether the tested code produces the expected results, both for unit tests and for complex test plans for scenarios of the system. If the expected results are not produced, the method and apparatus should point at the failure by indicating which operation or property of which object caused the failure. The tests should be reproducible so a bug report can be sent to a programmer together with the exact testing scenario that caused the bug, thus eliminating complex, time-consuming, and not necessarily successful reproductions. The method and apparatus should be applicable to all level of testing, whether unit test, integration test, system test or acceptance test.

SUMMARY OF THE PRESENT INVENTION

It is an object of the present invention to provide a novel method and framework for testing object which overcomes the disadvantages of the prior art. The disclosed method and apparatus require no addition of commands or data to the tested code, and without requiring a connective layer, such as a user interface layer for accessing the code.

In accordance with the disclosed invention there is thus provided a method for testing a software component, the software component comprising one or more objects, each object having one or more operations, the method comprising the steps of: generating a test definition associated with one or more operations for the software component; generating computer code reflecting the test definition; and executing the computer code for receiving one or more results associated with the operation. The method optionally comprises a step of reporting the one or more results. The object is optionally a computational object. The object optionally comprises one or more properties. Within the method, the test definition optionally comprises one or more values to be assigned to the properties. The test definition can comprise one or more operations to be invoked on the object. The method can be performed externally to the software component. Within the method, optionally no command or data is added to the object. The method can be performed directly on the software component. Optionally no connective layer is used for testing the software component. The test definition can comprise a comparison parameter for comparing two values of a property. The method can wherein generating the computer code comprises generating code for: loading the software component; creating at least a first instance and a second instance of the object; setting the a property of the first instance and the of the second instance to a value; invoking an operation for the first instance; and comparing the property of the first instance with the property of the second instance. Within the method, the test definition can comprise a serialized object. The step of generating the computer code can comprise generating code for validating an object against the serialized object. Another aspect often disclosed invention relates to a method of operating a computing platform for generating code implementing the code generation of the method above.

Yet another aspect of the disclosed invention relates to a framework for testing a software component, the software component comprising one or more objects, each object having one or more operations, the framework comprising: a test definition component for defining one or more tests for an object; a code generation component for generating code for the tests; and a test execution component for performing the tests by executing the code. The framework can further comprise a result viewing component for presenting an at least one result associated with the at least one test. Within the framework, the code generation component comprises: a component for generating code for connecting and loading a library; a component for generating code for creating a first instance and a second instance of an object; a component or generating code for setting a property of the object; a component for generating code for invoking the operation on the first instance; a component for generating code for comparing the first instance and the second instance; and a component for generating code for validating an object against a serialized description. The framework optionally tests the software component directly or externally.

Yet another aspect of the disclosed invention relates to a computer readable storage medium containing a set of instructions for a general purpose computer, the set of instructions comprising: a step of generating a test definition associated with an operation of an object comprised in a software component; a step of generating computer code reflecting the test definition; and a step of executing the computer code for receiving a result associated with the operation.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION OF THE PREFERRED EMBODIMENT

Definitions:

Object—an object is an individual unit used as a building block of computer programs written in the object-oriented programming methodology. An object generally comprises properties being data fields, and methods which perform functions on the object, optionally using the object properties, parameters, or external variables. For clarity, a method of an object will be referred to hereinafter as an operation, and computer-readable instructions will be referred to as code (rather than object code).

The disclosed invention comprises a framework and method for testing object code in three stages: defining one or more tests for testing a part of the functionality of an object, the test being a part of a test catalog; generating code for the test; and running the test. A partial or full test scenario, which optionally follows a test plan can be designed and performed using the disclosed invention. Each test definition is preferably derived from a test plan or part thereof, and provides a description of the test, rather than captures the test execution or results.

The first stage of the present invention relates to defining or updating a testing catalog, wherein a test catalog comprises one or more tests. Each test is associated with setting one or more properties of an object and/or activating one or more operations of objects to be tested. The user of the invention, typically a programmer of a unit containing an object or a quality assurance person in charge of testing one or more units, selects one or more units to be tested, such as one or more DLLs, static libraries, executables or other units comprising the property and/or method definition of one or more objects. The user then selects an object to be tested, sets values to editable properties of the object, and possibly checks the validity of the resulting object. An object having the assigned values is then created and possibly validated, for example by invoking an operation that stores the object in a persistent storage, such as a database, which performs checks on the object, such as a unique and acceptable identification field. In addition, the edited properties of the object are stored in a persistent manner, such as an XML file or another script file. Alternatively, all properties are stored, including the default ones set by the default constructor of the object. Alternatively, the user retrieves an object which was previously stored in persistent storage such as a database. The user then selects one or more operations to be called upon the created or retrieved object and optionally parameters required for the operation. The selected operations and parameters are also stored in the script file. The user optionally also defines the expected return values of the operation.

Once the test definition is complete, the second stage starts, in which the system automatically generates code according to the script, for performing the following actions: creating two copies of each object as described in the script, including assigning the defined values to the relevant properties, or retrieving the objects from storage such as a database; for each operation defined to be called, calling the operation for one of the objects while leaving the other one as is for comparison; comparing the properties of the first object with those of the second object for which the operation was invoked; and reporting the comparison results. The process repeats for each operation defined to be part of the test. Once the code is generated, the third stage which comprises running the code and thus performing the testing can start. When the test is to be performed, either for initial testing of the unit, for regression tests or for any other purpose, the generated code is run. During the run, two copies are created for each object, and the values defined by the test designer are assigned to the relevant properties of both objects. Alternatively, two objects are created according to the object description in the database. Then one object undergoes the operation defined by the test designer while the other one is left intact. Once the operation was completed, the editable properties of the two objects are compared; and the operation results as well as the comparison results are reported to the person performing the test. The user of the first and second stage is preferably a test designer, such as the programmer of the unit to be tested, or a test designer. The user of the third stage is a person who runs the test, such as a quality assurance person, and not necessarily the person who programmed the unit to be tested or the person who designed the test. The three stages can be implemented separately, using separate user interfaces and environments. Alternatively, they can be implemented in a unified environment, which supports the design, code generation and running stages.

Figure 1:
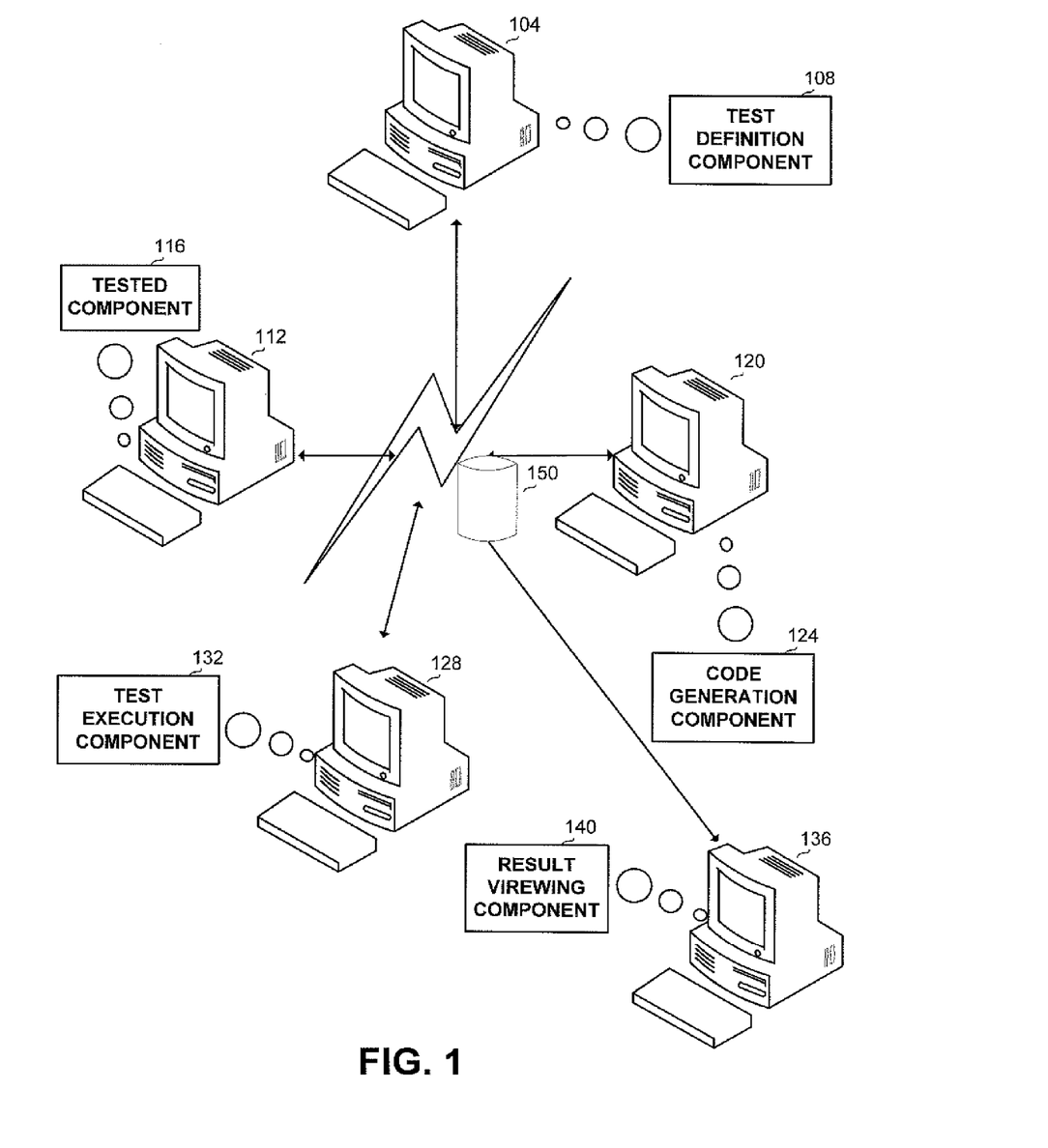
FIG. 1 is an illustration of a typical environment in which the disclosed invention is used.

Referring now to FIG. 1, showing a typical environment in which the disclosed invention is used. The general environment in which the disclosed invention is used comprises a computing platform 104. Each of computing platform 104 and computing platforms 112, 120, 128 and 136 detailed below is a general purpose computer, such as a personal computer, a network computer, a mainframe computer or any other computing platform provisioned with a CPU, a memory, a storage device or access to a storage device and optionally input and output devices such as a display, a keyboard, a mouse, a touch screen display, or the like. Each computing platform is preferably connected by a network 110 such as a Local Area Network (LAN), a Wide Area Network (WAN), or the like. Computing platform 104 runs software test definition component 108, which is optionally a software component stored on the storage device of computing platform 104 or accessed by computing platform. Test definition component 108 provides a user with the option to select one or more tested components 116, select objects from tested components 116, set values to properties of objects in tested components 116, select operations associated with objects from tested components 116, assign parameters or expected return values to the operations or the like. Component 108 preferably comprises user interface, but can also be an editor such as an XML or HTML editor for introducing the information. Tested component 116 is optionally stored on computing platform 112. In an alternative embodiment, tested component 116 is stored on computing platform 104. The environment further comprises a computing platform 120 running a code generation component 124 for generating code out of the test definition as defined using component 108. Code generation component 124 is stored on computing platform 120, or on any other computing platform in the apparatus. A further component of the apparatus is test execution component 132 which runs on computing platform 128. Test execution component 132 enables a user to select a test to be executed, and executes the code generated by code generation component 124 for tested component 116 according to the tests defined using test definition component 108. If the code is generated in a language that requires compilation or another processing, either code generation component 124 or test execution component 132 performs the processing. Yet another component of the framework is result viewing component 140 executing on computing platform 135 which comprises a user interface used for presenting to a user the results of activating test execution component 132. It will be appreciated by a person skilled in the art that components 108, 116, 124, 132 and 140 or a part thereof can be stored on any of computing platforms 104, 112, 120, 128 and 136 or on any other storage, and can run on any one or more of computing platforms 104, 112, 120, 128 and 136. Further, any one of platforms 104, 112, 120, 128 and 136 can be comprised of two or more separate computing platforms. Thus, an apparatus according to the disclosed invention can comprise any number of computing platforms, and any number of components stored and running thereon. Computing platforms 104, 120 and 128 require access to a storage device 150 such as a database stored on a magnetic device, an optic device or a semiconductor device for storing and retrieving information such as objects script files or the like. The framework of the disclosed invention preferably includes test definition component 108, code generation component 124, test running component 143 and optionally result viewing component 140.

Figure 2:
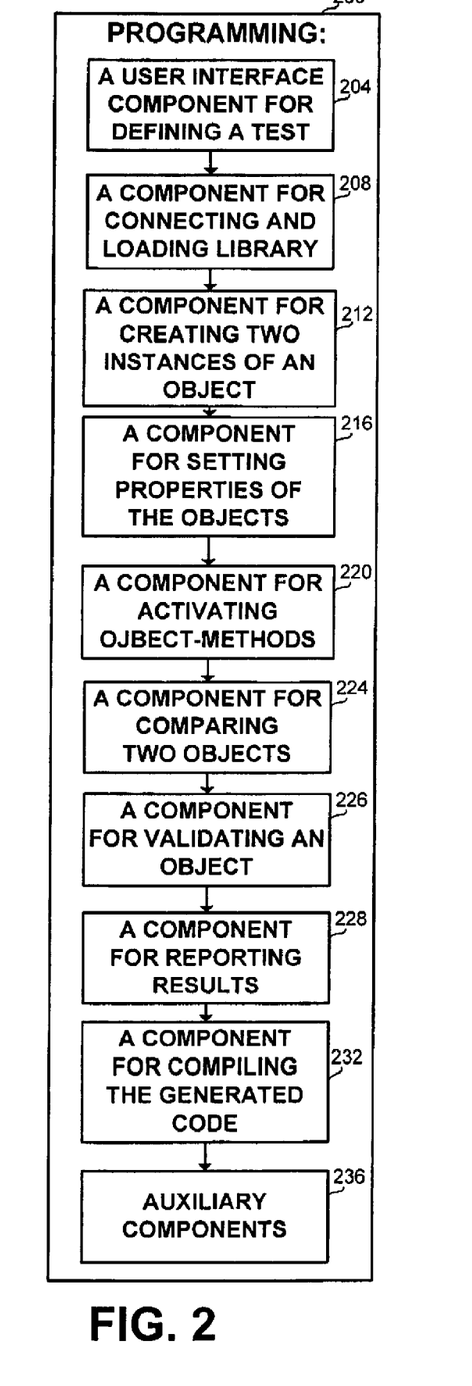
FIG. 2 is a flowchart of the main steps in a preferred embodiment of a method for carrying out the disclosed invention.

Referring now to FIG. 2, showing a flowchart of the main steps in a method for carrying out the disclosed invention. The disclosed invention is a tool for automatic generation of testing code. Thus, in order to carry out the invention, the code generator has to be implemented by operating a computing platform. The implementation can be performed in any programming language such as C++, C#, VB, VB.Net, Java, or other languages, such as the languages supported by .Net environment, and under any development environment, such as Windows Net. The method for programming the tool, generally referenced as 200 includes a step 204 of programming user interface for defining a test. The user interface should be programmed to allow a user to select a library to be tested, select an object from the library, and optionally any one or more of the following operations: set one or more properties of the object, validate the object for example by storing it in a persistent storage such as a database, store a description of the changes made to the object preferably in a script file, select an operation of the object, assign parameters to the operation, or declare required return value of the operation. The user may further declare properties of the objects that should not be compared, or properties that should be compared in a non-straightforward way, for example a date range so that dates differing in at most this range are considered equal, a value tolerance, or the like. The user interface is preferably programmed to generate a script comprising the user's selections, definitions and actions, at the same order as performed by the user, so that at testing time they are performed in the same order. The user interface should preferably enable a user to store the products of the test definition component, e.g. the script file, and reload them later in order to continue the work. The method then comprises step 208 of programming code to retrieve the names and locations of the libraries to be tested from the script generated by the user and for loading them. Then on step 212 an implementer of the disclosed method writes code for retrieving from the script the objects selected by the user, and creating two instances of each such object. On step 216 the implementer writes code for retrieving from the script properties of the object and corresponding values, and assigning the values to the properties of the created objects. On step 220 the implementer writes code for retrieving from the script the operations to be activated with the relevant parameters, and for activating the operations upon one instance of the object. At step 224 the implementer writes code for comparing return values of the activated operations with the values defined by the user, and for comparing the editable fields of the first and the second instances according to the comparison definition as described in association with step 434 of FIG. 4 below. This comparison makes sure that the properties changed by the invocation of the method did not set wrong values to properties, and did not damage the values of other properties. The comparison compares all properties for which values were set. For example, a specific property can be set by the test designer, which is different from the value set to the same property by an operation, since the operation contains a mistake, such as a programmatic mistake. Thus, as long as the programmatic mistake is not corrected, the comparison will return an error, since the manually set value is not identical to the value set by the operation. The non-editable properties are preferably compared by invoking dedicated operations, since specific logic of the object is often involved in setting these properties. On step 226 the implementer writes code for validates any object against an instance of the object as created and serialized during design time. This code is useful for validating the correctness of objects that were created or changed as aside effect of activating an operation of another object, such as a "sale" object created as a side effect of an "add sale" operation of a customer. On step 228 the implementer writes code for outputting the comparison of the return values of the activated operations and the comparison of the properties between the two instances. At step 232 the implementer optionally programs code for calling a compiler to compile the code that will be generated when the system will be run in test-design time. If the code is generated in a language that is interpreted rather than compiled, than step 232 can be omitted. On step 236 the implementer optionally writes auxiliary code, for example for retrieving a field from the script, for controlling the program flow between the other components, general routines, or the like. The generated code can also be generated as C, C++, C#, Java code, or any other programming language.

It should be appreciated that using the user interface during the test design time optionally generates a script of the user's actions and selections, the script being stored and then retrieved and analyzed by the programmed code, this enabling a test designer to view or edit the script. If a script is generated, it can be generated in any required format, such as plain text, XML, or the like. Alternatively, the code for generating the testing code may be integrated with the user interface, so the user's actions and selections are not stored in a storage device, rather the generated or compiled code is stored.

Figure 3:
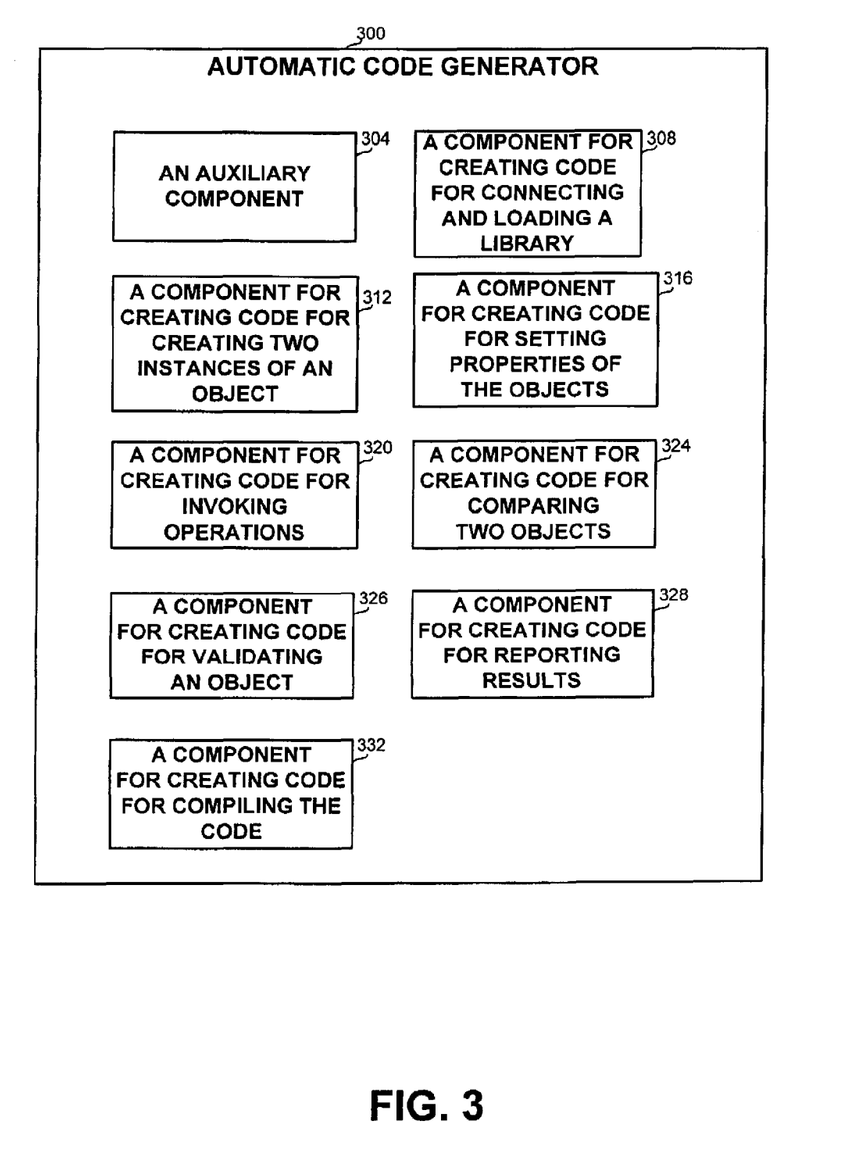
FIG. 3 is a block diagram of the main components of the code generator, in accordance with a preferred embodiment of the disclosed invention.

Referring now to FIG. 3, showing a block diagram of the main components of code generator 124 of FIG. 1. The components are preferably programmed as detailed in association with FIG. 2 above. Automatic code generator 300 comprises code creating components for retrieving data from the output of test definition component 108 of FIG. 1, e.g., a script file, and generating code according to the data. The components of the automatic code generator, generally referenced as 300, comprise an auxiliary component 304 which provides auxiliary functionalities, such as retrieving information from the output of test definition component 108 of FIG. 1, transferring control to other components or the like. Automatic code generator 300 comprises component 308 for retrieving from the output of test definition component 108 of FIG. 1 the name, identification, location or other parameters of a library to be tested, and generating code for loading these libraries. Automatic code generator 300 further comprises component 312 for retrieving from the output of test definition component 108 of FIG. 1 the name or other identification of an object, and for generating code that creates two instances of the object, either by constructing the objects and setting the properties or by retrieving them from a database. Yet another component of Automatic code generator 300 is component 316 for retrieving properties of the object retrieved in step 312 and values to be assigned to these properties, and for assigning the values to the properties of the two instances created. Component 320 is a further component of automatic code generator 300, designed for retrieving operations from the output of test definition component 108 of FIG. 1 and optionally parameters for the operations, and generating code for activating the operations on the second instance of the object. Component 324 generates code for comparing the properties of the first and the second object, and for comparing the required return values of the operation as indicated by the user through using test definition component 108 of FIG. 1, with the actual value returned from calling the operation. Component 326 generates code for validating a newly created instance of an object against an object created from a serialized description. This validation is useful for objects such as objects that are side effects of an operation on another object. Component 328 generates code for reporting the comparison results and additional data, such as testing time, duration of testing, duration of execution, resource usage and the like. The reporting can be made using any required format, such as plain text, XML, spreadsheet, or the like. Alternatively, the user can indicate the required output format, and the code will be generated by component 328 accordingly. Component 332 compiles the code generated by components 308, 312, 316, 320, 324 and 328. Component 332 can be omitted, requiring a user to activate a compiler to compile the generated code. The user can access, view, or change the generated code prior to compiling. Component 336 provides auxiliary functionalities, such as retrieving information from the output of user interface component 304, transferring control to other components or the like.

Figure 4:
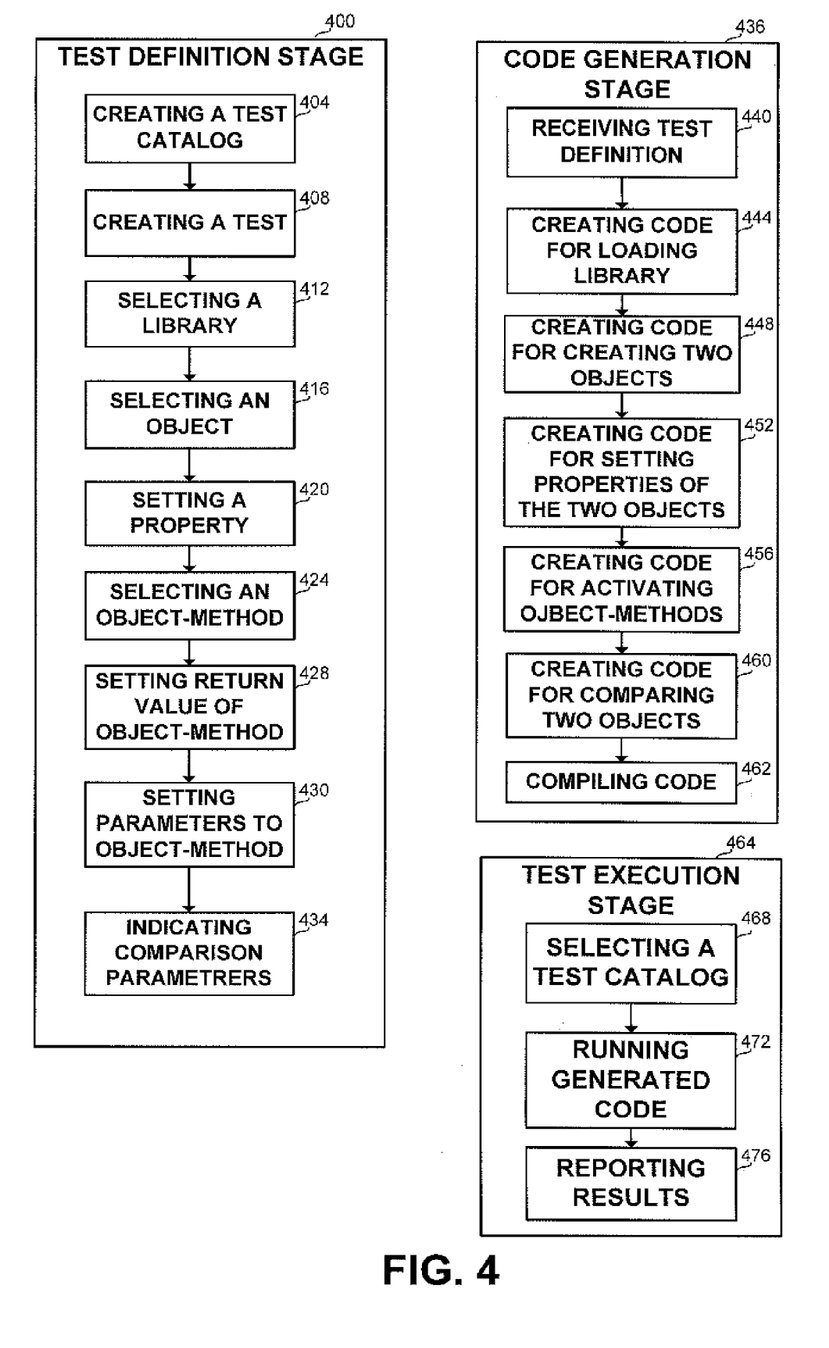
FIG. 4 is a flowchart of the main steps in a preferred embodiment of a method for using the disclosed invention

Referring now to FIG. 4, showing a flowchart of the main steps in using the disclosed invention. The disclosed invention is preferably used in three stages: a test definition stage 400, a code generation stage 436 and test execution stage 464. Preferably, test definition stage 400 and code generation stage 436 are performed at design time, while test execution step 464 is performed at run time. Test definition stage 400 is performed at design time by a user defining tests to check one or more tested libraries or other components, the user utilizing user interface 304 of FIG. 3. Test definition stage 400 comprises an optional test catalog creation step 404, in which a user creates a test catalog, being a collection of related tests which logically should be performed in a sequence. However, no check is performed that the tests are indeed related, so that a catalog is merely a collection of conceptually related tests. On step 408 the user creates a new test, and optionally names it. The test is optionally associated with a test catalog generated on step 404. On step 412 the user selects one or more libraries, DLLs, static libraries, modules, executables or other components to be tested in the test created on step 408. The library is preferably a library that was programmed using an object oriented methodology, and comprises one or more objects. Alternatively, step 412 of selecting libraries can be performed prior to creating a test catalog step 404 and creating a test step 408. On step 416 the user selects one or more of the objects contained in the libraries selected on step 412. Step 416 preferably enables the user to select only from the objects publicized by the components, but can alternatively enable calling other objects. On step 420, the user sets one or more properties of an object to have predetermined values. The user can further check during step 420 one or more attributes associated with a property of the object such as whether the property is editable or read-only, the property type or size, whether the property is mandatory or not, and the like. The object can further be tested even during design time, by creating, storing and retrieving the object, and checking that all properties have adequate attributes. The validity of the object is preferably checked by storing it in a database, or by performing another validity check. On step 424 the user selects an operation associated with the object. On step 428, the user defines a return value, or a result for the object method selected on step 424, and on step 430 the user optionally defines one or more parameters to be supplied to the operation. On step 434 the user optionally defines parameters for the comparisons between an object for which the object method was called and an object for which it was not activated. The comparison may include properties not to be compared, properties to be compared in special manner, such as an allowed date or time difference, or the like. On step 424 the test designer can select for any object a unique operation added by the methods of the current invention to each object, which relates to validating the object. This operation is preferably selected after an object was created and saved at design time, for example by being serialized into an XML structure. The validation operation is preferably used for comparing objects other than the objects upon which operations were activated. Such objects may be the result of a complex operation or scenario. For example, if performing the operation of "adding a sale" of an object "customer" is supposed to create a new object representing a "sale", then the newly created "sale" object is preferably generated and serialized in design time, and the serialized object is then compared in run time to the "sale" object created in run time. Preferably, upon creation of the new object, it is checked by the test designer and manually corrected if any field is incorrect. For example, if the "price per unit" property of a sale is a result of a specific calculation, then this property can be set by the test designer (who manually performs the calculation), and serialized with the manually set correct value. Then, when an object is created in run time, if the object is generated such that the "price per unit" is calculated in a wrong way so that a different result is produced, the value is not equal to the manually generated value and an error is reported. On step 428, the return value defined can also be an error, such as an exception returned by the object-method. For example, a test designer may test that an attempt to add the same object twice to a database results in an error of non-unique object rather than a success or another error code. A description and/or an error code can be attached to any possible return value of an object-method, the description and/or error code displayed in a run-time report of the test. Once test definition stage 400 is completed, code generation stage 436 can be initiated. Code generation stage 400 comprises step 440 for receiving the test definition as defined on stage 400. The receiving can either be reading a script, retrieving from storage such as a database, or through reading from memory, if the first and the second stages are carried out using the same environment. Code generation stage 436 further comprises step 444 for generating code for loading the tested library, step 448 for generating code for constricting two instances of the objects selected on step 416, step 452 for generating code for setting properties to the two instances, step 456 for generating code for activating the operations selected on step 424 on one instance of the object, and step 460 for generating code for comparing the two instances. Preferably, the comparison relates only to the properties set at step 420, and for which code was generated at step 452. Code generation stage 436 further comprises compilation step 462, if required for the language and environment in which the code is generated. Code generation steps 436, (excluding compiling code step 462) can be performed intermittently with relevant steps within test definition step 400, and not necessarily as a sequence. Thus, one or more of code generation steps 436 can be executed once the data for the relevant code is available. For example, creating code for loading library step 444 can be performed concurrently or immediately after selecting a library step 412, and similarly for other steps. The code can be created in any programming language, script file or any file type such as XML.

The third stage is test execution stage 464, comprising selecting one or more test catalogs defined on step 404. Test execution step 464 further comprises step 472 for running the code generated and compiled for the tests associated with the test catalogs, and step 476 for reporting the results. The report optionally comprises for each test within each test catalog the return value of the performed operation, and whether the editable properties of the object for which the operation was activated are equal to the properties of the reference object. The properties do not have to be identical, but should rather comply with the comparison parameters as indicated in step 435.

Figure 5:
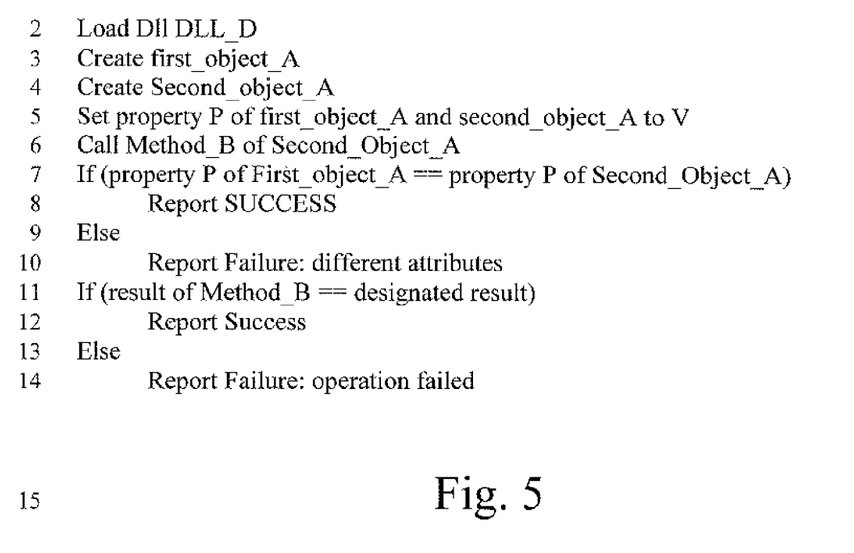
FIG. 5 is a listing of pseudo code showing the main steps in the generated code, in accordance with a preferred embodiment of the disclosed invention.

Referring now to FIG. 5, showing a listing of pseudo code showing the main elements of the code generated when a test designer chooses to test Method_B of Object_A contained within DII D. On line 4 DLL D is loaded, on lines 5 and 6 two instances of object A are created, on line 6, property P defined by the user to receive value V is set in both objects; on line 7 method B is called for one object while the other one remains intact as reference. On lines 9 to 12 the properties set by the test designer, property P in this case is compared and the results are reported, and on lines 13-16 the return value of method B is compared to the expected value and the comparison result reported.

Figure 6:
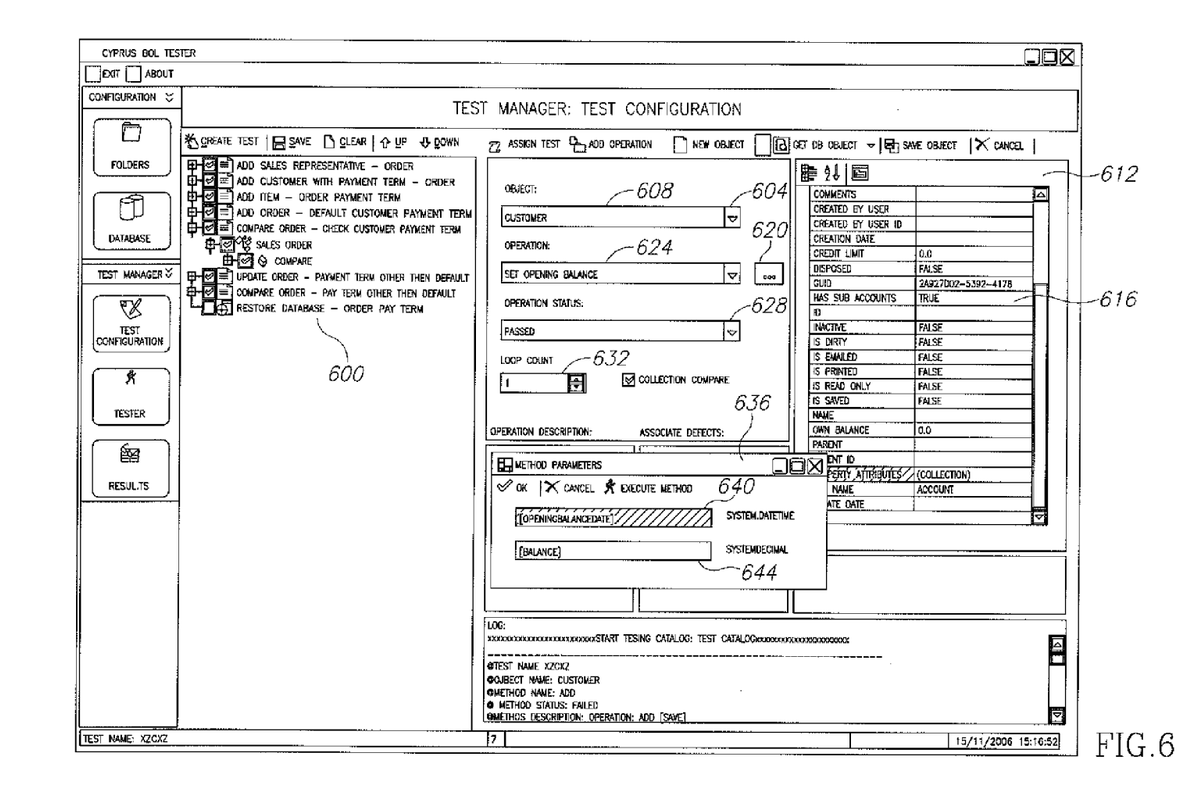
FIG. 6 is an illustration of a user interface for defining a test, in accordance with a preferred embodiment of the disclosed invention.

Referring now to FIG. 6, showing a preferred embodiment of the user interface for defining a test. Pane 600 shows a list of the existing tests comprised defined for the active test catalog. Clicking or otherwise pointing on arrow 604 will enable the test designer to select one of the objects publicized by the DLL for which the test is designed. On FIG. 6, the object "customer" is selected as shown in box 608. Pane 612 shows the properties of the "customer" object, wherein the test designer can change the value of any of the editable properties, such as property "HasSubAccount" 616. Clicking or otherwise pointing on arrow 620 opens a dropdown menu form which the test designer can choose an operation associated with the selected object, such as operation "SetOpeningBalance" shown in text 624. Clicking or otherwise pointing on arrow 628 will open a drop down menu from which the user can select the required return value of the operation, and choosing a value larger than one in loop count 632 will cause the test to run the selected operations multiple times, for load testing, performance and other quantity-related factors. Using window 636 the test designer selects parameters for operation 624. The parameter types 640 and 644 are known from the object description as publicized by the library. Once the test designer has finished designing the test, code is generated and the test is added to test list 600 of the current catalog. When the catalog is run, the current test will be run together with all other tests defined in the catalog.

Figure 7:
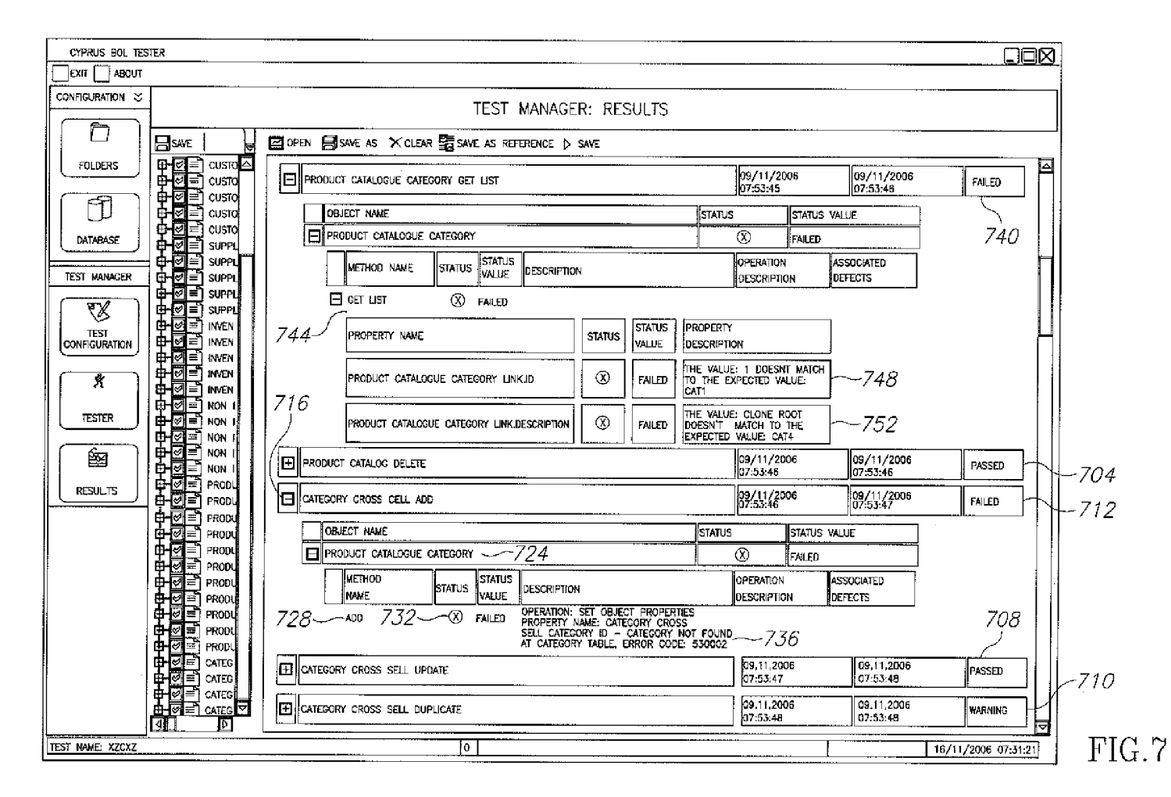
FIG. 7 is an illustration of a user interface for receiving test results, in accordance with a preferred embodiment of the disclosed invention.

Referring now to FIG. 7, showing an illustration of a screen presenting the output of running a test catalog. Some tests such as tests 704 and 708 passed, some have warnings, such as 710 while others failed. Test 712, named "category cross sell add" filed, and clicking or otherwise pointing at icon 716 shows the details of the failed test, in this case object name being "product catalogue category" 724, and the failed method "Add" 728, its status value "failed" 732 and description 736. Another failed test is "product catalogue category get list" 740, for which the comparison between the object upon which operation "get list" 744 was invoked and the reference object yielded differences in the properties "product catalogue category link.id" 748 and "product catalogue category link.desciption" 752.

The disclosed invention provides a framework for systematic testing of an object oriented product. The disclosed method and apparatus enable testing of the setting of each property and invoking each operation of an object contained within a tested unit such as a DLL. Simple unit tests, as well as partial or full testing scenarios, which can be based on test plans can be designed and performed. The method and apparatus are external to the code, i.e. non-intrusive and require no commands or data to be added to the operational code of the object, thus leaving no footprint on the code. Since the framework enables testing without requiring user interface or another connective layer for accessing the code, the testing is done directly on the objects rather than via a connective layer. The method and apparatus enable running full testing scenarios, for purposes which include initial testing by the programmer of an object as well as regression tests that should be run each time the code is changed. A failed test or a test catalog can be sent to a programmer in order to point out a problem that was detected during integration with additional libraries, at installation time, or under other circumstances. Thus, the programmer does not have to invest effort in reproducing the problem, but merely has to run the problematic test scenario. The disclosed invention can be used for testing libraries developed in any programming language and under any development environment, as long as it contains one or more accessible objects. It will be appreciated by a person skilled in the art, that if a new object is added to a library for which test catalogs and tests exist, the existing tests should run in the same manner and provide the same results for the enhanced library. The user can then design and run additional tests for testing the new functionality. It will be further appreciated that the disclosed invention can be operated on any computational object, such as an object designed for business operations, scientific operations, or the like. This is due to the possibility to test the object without providing a user interface or another connective later for connecting to and activating the objects.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventors and therefore include structure, acts or details of structures and acts that may not be essential to the invention and which are described as examples.

It will be appreciated by a person skilled in the art that the method and apparatus can be implemented in other ways, possibly with other divisions into stages, steps or components without deviating from the spirit of the current invention. The user interface suggested is also exemplary only and other user interfaces can be suggested. Alternatively, the apparatus can be employed without a graphical user interface, wherein the test designer merely writes a script upon which the code is generated, and the reports are exported to a third party tool, such as a spreadsheet. It will also be appreciated that the disclosed apparatus may include various computer readable media having suitable software thereon, for example, disks, diskettes, flash RAM or the like.

The present invention is not limited to what has been particularly shown and described hereinabove. Structure and acts described herein are replaceable by equivalents, which perform the same function, even if the structure or acts are different, as known in the art. The scope of the present invention is defined only by the claims which follow. When used in the following claims, the terms "comprise", "include", "have" and their conjugates mean "including but not limited to".

The invention claimed is:

1. A method for testing a software component, the software component comprising an at least one object, the at least one object having an at least one operation, the method comprising the steps of:
    generating an at least one test definition associated with the at least one operation for the software component;
    generating computer code reflecting the at least one test definition, the computer code comprising code for:
        loading the software component:
        creating at least a first instance and a second instance of the at least one object;
        setting the at least one property of the first instance and the at least one property of the second instance to an at least one value:
        invoking the at least one operation for the first instance: and
        comparing the at least one property of the first instance with the at least one property of the second instance; and
    executing the computer code for receiving an at least one result associated with the at least one operation.

2. The method of claim 1 further comprising a step of reporting the at least one result.

3. The method of claim I wherein the at least one object is a computational object.

4. The method of claim 1 wherein the at least one object comprises an at least one property.

5. The method of claim 4 wherein the at least one test definition comprises an at least one value to be assigned to the at least one property.

6. The method of claim I wherein the at least one test definition comprises an at least one operation to be invoked on the at least one object.

7. The method of claim I wherein the method is performed externally to the software component.

8. The method of claim 1 wherein no command or data is added to the at least one object.

9. The method of claim 1 wherein the method is performed directly on the software component.

10. The method of claim 1 wherein no connective layer is used for testing the software component.

11. The method of claim 4 wherein the at least one test definition comprises a comparison parameter for comparing two values of the at least one property.

12. The method of claim 1 wherein the at least one .test definition comprises a serialized object.

13. The method of claim 12 wherein the step of generating the computer code comprises generating code for validating an at least one object against the serialized object.

14. A method of operating a computing platform for generating code implementing the code generation of the method of claim 1.

15. A framework stored on memory for testing a software component, the software component adapted to be executed by at least a first computing platform, the software component comprising an at least one object, the at least one object having an at least one operation, the framework comprising:
    a test definition component for defining an at least one test for the at least one object;
    a code generation component for generating code for the at least one test, comprising:
        a component for generating code for connecting and loading a library:
        a component for generating code for creating a first instance and a second instance of the at least one object:
        a component or generating code for setting an at least one property of the at least one object:
        a component for generating code for invoking the at least one operation on the first instance:
        a component for generating code for comparing the first instance and the second instance; and
        a component for generating code for validating an object against a serialized description; and
    a test execution component for performing the at least one test by executing the code;

wherein at least one of said components is adapted to be executed by the at least one first computing platform or by a second computing platform.

16. The framework of claim 15 further comprising a result viewing component for reporting an at least one result associated with the at least one test.

17. The framework of claim 15 wherein the framework tests the software component directly.

18. The framework of claim 15 wherein the framework tests the software component externally.

19. A non-transitory computer readable medium containing a set of instructions for a general purpose computer, the set of instructions comprising:
 a step of generating an at least one test definition, associated with an at least one operation of an at least one object comprised in a software component;
 a step of generating computer code reflecting the at least one test definition, comprising:
  loading the software component;
  creating at least a first instance and a second instance of at least one object:
  setting the at least one property of the first instance and the at least one property of the second instance to an at least one value:
  invoking the at least one operation for the first instance: and
  comparing the at least one property of the first instance with the at least one property of the second instance; and
 a step of executing the computer code for receiving an at least one result associated with the at least one operation.

* * * * *